United States Patent
Mårtensson et al.

(10) Patent No.: US 8,528,344 B2
(45) Date of Patent: Sep. 10, 2013

(54) BLEED STRUCTURE FOR A BLEED PASSAGE IN A GAS TURBINE ENGINE

(75) Inventors: Hans Mårtensson, Trollhättan (SE); Martin Nilsson, Göteborg (SE)

(73) Assignee: Volvo Aero Corporation, Trollhätan (SE)

( * ) Notice: Subject to any disclaimer, the term of this patent is extended or adjusted under 35 U.S.C. 154(b) by 435 days.

(21) Appl. No.: 12/752,284

(22) Filed: Apr. 1, 2010

(65) Prior Publication Data
US 2010/0199633 A1 Aug. 12, 2010

Related U.S. Application Data

(60) Division of application No. 11/813,228, filed as application No. PCT/SE2006/000204 on Feb. 14, 2006, now Pat. No. 8,484,982, and a continuation-in-part of application No. PCT/SE2005/000452, filed on Mar. 24, 2005.

(60) Provisional application No. 60/593,941, filed on Feb. 25, 2005.

(51) Int. Cl.
*F02C 6/08* (2006.01)
*F02C 6/04* (2006.01)

(52) U.S. Cl.
USPC .............................................. 60/785; 60/782

(58) Field of Classification Search
USPC ........................ 60/782, 785, 795, 262, 226.1
See application file for complete search history.

(56) References Cited

U.S. PATENT DOCUMENTS

| | | | | |
|---|---|---|---|---|
| 3,058,302 A | * | 10/1962 | Knzyk | 60/264 |
| 3,161,018 A | * | 12/1964 | Sandre | 60/262 |
| 4,537,277 A | * | 8/1985 | Bryce | 181/214 |
| 5,123,240 A | * | 6/1992 | Frost et al. | 60/779 |
| 5,209,633 A | * | 5/1993 | McGreehan et al. | 415/144 |
| 5,845,482 A | * | 12/1998 | Carscallen | 60/785 |
| 6,050,527 A | * | 4/2000 | Hebert et al. | 244/210 |
| 6,702,873 B2 | * | 3/2004 | Hartman | 95/8 |
| 2009/0094989 A1 | * | 4/2009 | Kraft et al. | 60/785 |

* cited by examiner

*Primary Examiner* — Gerald Sung
(74) *Attorney, Agent, or Firm* — WRB-IP LLP

(57) ABSTRACT

A bleed structure for a bleed passage in a gas turbine engine includes a first wall portion defining a first side of an opening for the passage, and a second wall portion defining a second side, opposite the first side of the opening. The first and second wall portions end at different positions in an extension direction of the opening.

15 Claims, 7 Drawing Sheets

BLEED STRUCTURE FOR A BLEED PASSAGE IN A GAS TURBINE ENGINE

The present application is a divisional of U.S. application Ser. No. 11/813,288, filed Jul. 2, 2007, which is the U.S. national stage of PCT/SE2006/000204, filed Feb. 14, 2006, and claims benefit of U.S. Provisional Application 60/593,941, filed Feb. 25, 2005, and claims priority to International Application PCT/SE2005/000452, filed Mar. 24, 2005, all of which are incorporated by reference. The present invention relates to a bleed structure for a bleed passage in a gas turbine engine, the structure comprises a first wall portion defining a first side of an opening for the passage and a second wall portion defining a second side, opposite the first side of the opening. The bleed structure is intended to be arranged in the gas turbine engine so that the first wall portion is located upstream of the bleed passage opening and the second wall portion is located downstream of the opening.

BACKGROUND AND SUMMARY

The bleed structure may be used in stationary gas turbine engines, but is especially advantageous for aircraft jet engines. Jet engine is meant to include various types of engines, which admit air at relatively low velocity, heat it by combustion and shoot it out at a much higher velocity. Accommodated within the term jet engine are, for example, turbojet engines and turbo-fan engines. The invention will below be described for a turbo-fan engine, but may of course also be used for other engine types.

An aircraft gas turbine engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan.

Part of the incoming air flow to the aircraft engine enters an inner, primary gas duct, which guides the air to the combustor, and part of the incoming air flow enters an outer, secondary gas duct (fan duct) in which the engine bypass air flows.

In known aircraft engines, a bleed passage extends between the primary gas duct and the secondary gas duct. According to a known configuration, a variable bleed passage system is adapted to bleed air from the primary gas duct to the secondary gas duct. In certain operational conditions, compressed air is bled from the primary gas duct via the bleed passage and introduced in a high speed gas flow in the secondary gas duct.

There is a risk that the bleed air will negatively effect the stability or efficiency of the engine or cause vibration problems. A small air cushion is created when the bleed air meets the gas flow in the fan duct, which locally increase the pressure in the forward end of the outlet. This increased pressure creates a non-uniform distribution of the bled gas flow, which leads to losses. More specifically, for a set extension of the outlet in the axial direction of the engine, the bleed gas will only flow into the gas duct through a small part of the outlet at the downstream end of the outlet.

It is desirable to achieve a bleed structure for a gas turbine engine, which creates conditions for an effective bleed while not negatively influencing the operation of the engine or at least keep the negative effects to a minimum. More specifically, it is desirable to improve the flow distribution in the bleed passage with no substantial negative effects on the gas flow in a gas duct from which the air is bled and/or in a gas duct into which the bled air is introduced.

In accordance with an aspect of the present invention, the first and second wall portions end at different positions in an extension direction of the bleed passage opening. Thus, the first and second wall portions end at different positions in a direction of the bleed flow in the bleed passage. In other words, the first and second wall portions end at different positions in a direction perpendicular to a plane in parallel to the walls defining the opening.

Such an opening configuration at a bleed passage outlet creates conditions for a more favorable pressure distribution in a gas flow in the bleed passage. Likewise, such an opening configuration at a bleed passage inlet creates conditions for a more favorable pressure distribution in the bleed passage.

The opening configuration is especially advantageous in applications for bleed between a primary gas duct and a secondary gas duct where a pressure difference is small between a compressor portion and the secondary gas duct (fan duct) in order to secure bleed through-flow to a sufficient extent and in the intended direction. The opening configuration is further advantageous in applications where there is a limited space available for the bleed opening.

According to an aspect of the invention, for a bleed passage outlet, an upstream wall portion ends at a position closer to a wall defining the gas duct, which is opposite said bleed passage opening, than the downstream wall portion. The speed of the introduced bleed gas may then be levelled to some extent at the outlet in the axial direction of the gas turbine and a larger bleed flow may be introduced than according to prior art. In other words, the bleed gas will flow into the gas duct through a larger part of the outlet.

Thus, according to an aspect of the invention, one of the first and second wall portions is raised relative to the adjacent surfaces of the structure. This opening configuration at the outlet creates conditions for introducing a large bleed air flow into the gas duct.

According to a further aspect of the invention, the other of the first and second wall portions is flush with the adjacent surfaces of the structure. This opening configuration at the outlet creates conditions for substantially not negatively effecting the passing gas flow in the gas duct into which the bleed air is introduced.

According to a further aspect of the invention, one of the first and second wall portions is lowered relative to the adjacent surfaces of the structure. This opening configuration at the inlet creates conditions for substantially not negatively effecting the passing gas flow in the gas duct from which the bleed air is extracted.

According to a further aspect of the invention, a transition from at least one of said first and second wall portion to an adjacent gas duct wall is even so that any disturbance caused by bleed on a passing gas flow is minimized. The transition portion is preferably smooth, uninterrupted and substantially flat.

According to a further aspect of the invention, it comprises at least one airfoil in said bleed passage opening for guiding a gas flow in the passage. By virtue of the airfoils, the bleed air may be guided in a desired direction to/from the bleed passage. Further, the airfoils create conditions for a larger deflection of the bleed flow in a set axial distance.

Further advantageous embodiments and further advantages of the invention emerge from the detailed description below.

BRIEF DESCRIPTION OF THE DRAWINGS

The invention will be explained below, with reference to the embodiments shown on the appended drawings, wherein.

DETAILED DESCRIPTION

Figure 1:
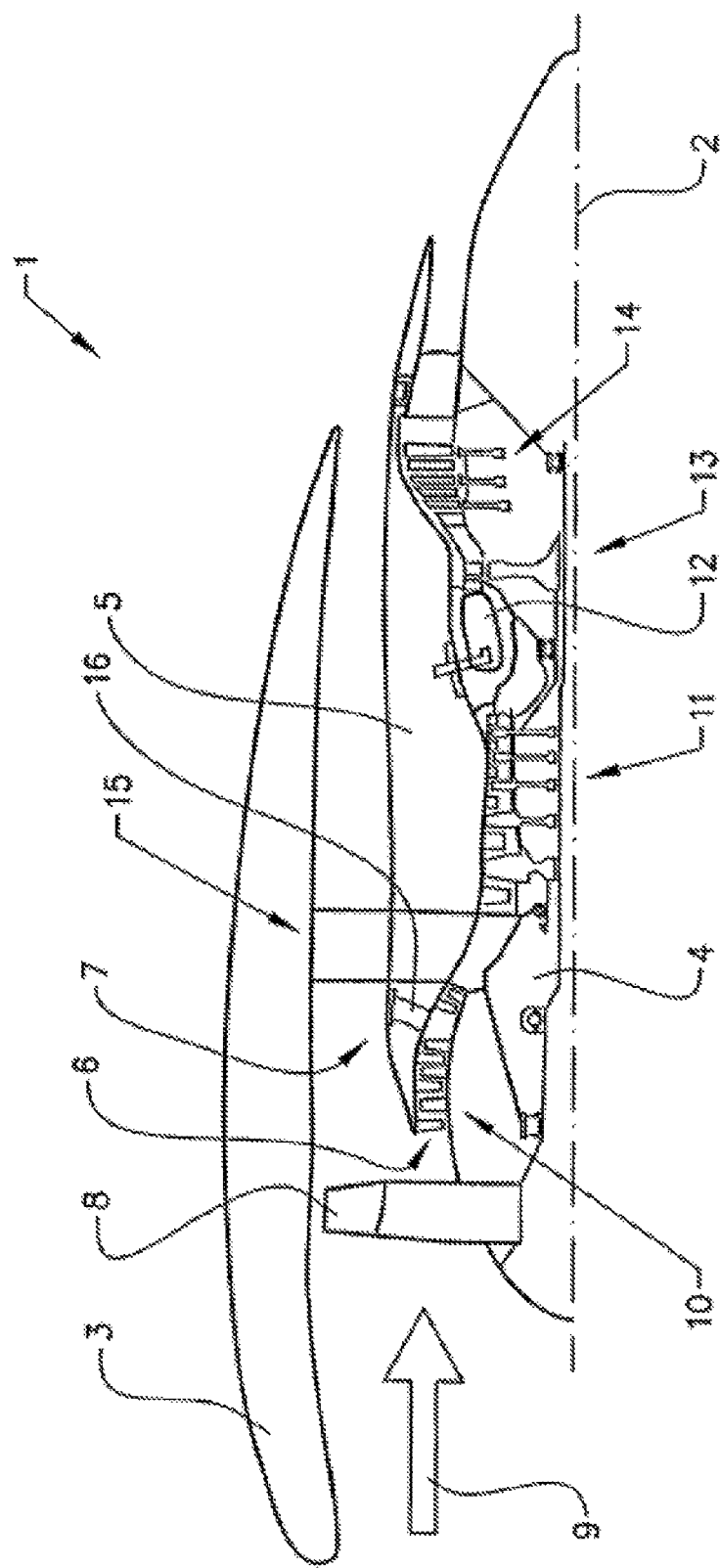
FIG. 1 illustrates an aircraft engine in a schematic cut side view.

The invention will below be described for a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas duct 6 for the compression of air and a secondary duct 7 in which the engine bypass air flows. Thus, each of the gas ducts 6,7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas duct 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed coaxially with and radially inwardly of the high pressure rotor.

A load carrying engine structure 15 is arranged between the outer casing 3 and the inner casing 4.

A plurality of circumferentially spaced bleed passages 16 extend between the primary gas duct 6 and the secondary gas duct 7. The bleed passages 16 define a flow path for routing air from the primary gas duct 6 to the secondary gas duct 7 and more specifically from an end region of the low pressure compressor 10. A bleed passage inlet is arranged in a gap between an upstream rotor and a downstream stator in the low pressure compressor 10.

Figure 2:
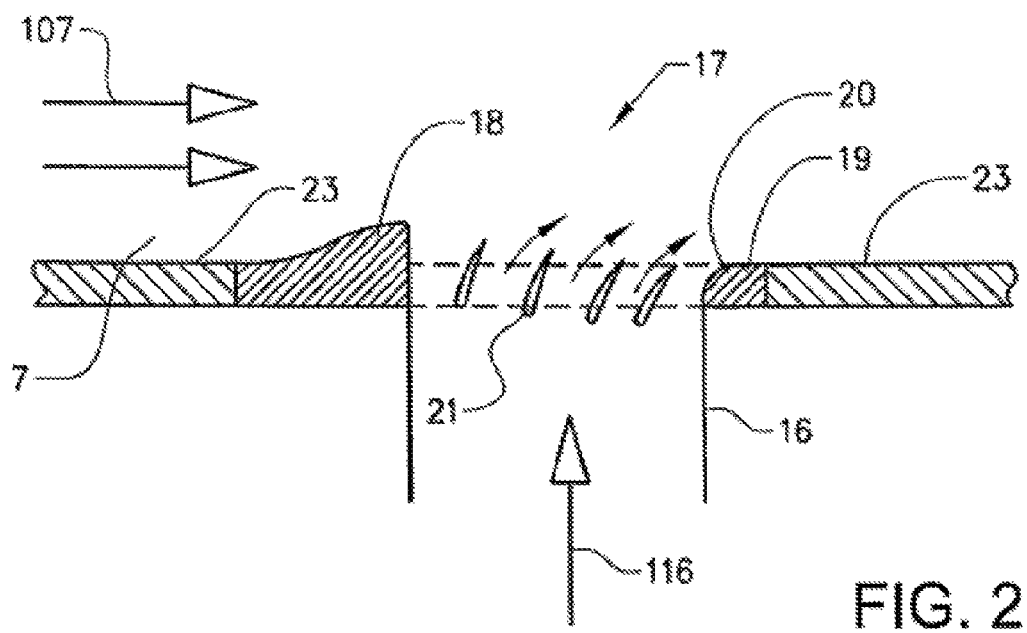
FIG. 2 shows a cut side view of a first embodiment of a bleed structure outlet configuration.

FIG. 2 shows a cut side view of a first embodiment of a bleed structure 17 forming a bleed passage outlet to the secondary gas duct 7. The structure 17 comprises a first, upstream wall portion 18 forming a leading edge of the outlet. The structure 17 further comprises a second, downstream wall portion 19 forming a trailing edge of the outlet. The first and second wall portions 18,19 end at different distances in the extension direction of the passage 16.

The wall 23 defining the gas duct 7 is substantially at the same level across the bleed opening (outlet). Thus, the wall 23 extends along a substantially straight line across the opening.

More specifically, the upstream wall portion 18 is raised relative to the adjacent surfaces of the structure and the gas duct wall 23. Further, the upstream wall portion 18 is raised relative to the downstream wall portion 19 so that a gas flow 107 in the duct 7 is directed somewhat radially away from the outlet and thereby creating a low pressure region outside the outlet. The upstream wall portion 18 is smoothed and aerodynamically rounded for reducing discontinuities in the fan gas duct flow. Further, a transition from said upstream wall portion 18 to the adjacent gas duct wall 23 is even so that any disturbance caused by bleed on the passing gas flow 107 is minimized.

Figure 5:
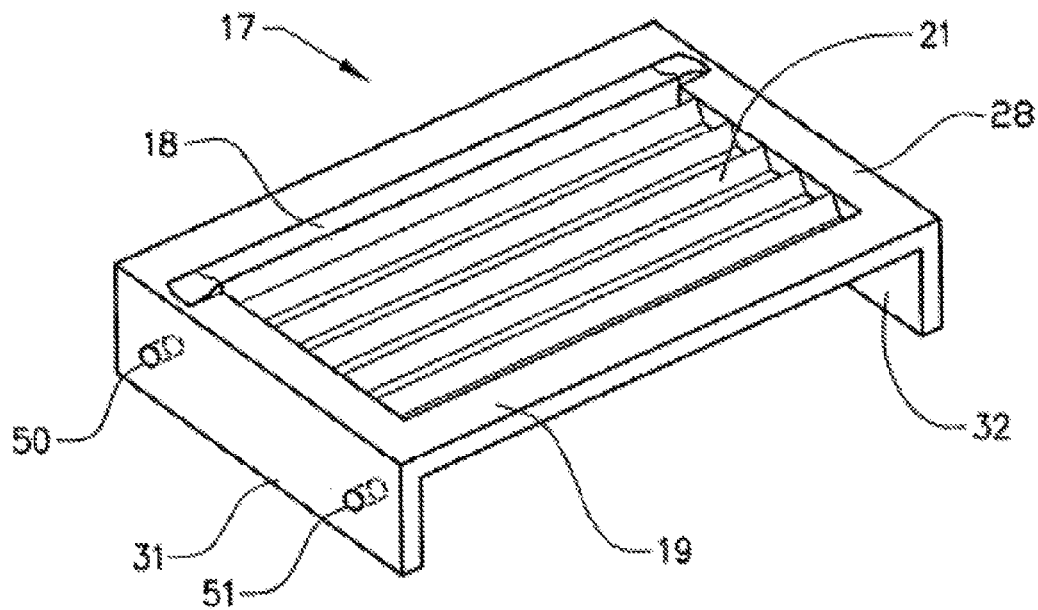
FIG. 5 shows a perspective view of the bleed structure of FIG. 2, FIGS. 6, 7, 8 and 9 each shows a bleed outlet structure according to an alternative embodiment.

The raised upstream wall portion 18 forms an elongated projection extending in the circumferential direction of the structure along an upstream side of the outlet, see also FIG. 5. The downstream wall portion 19 is substantially flush with the adjacent surfaces of the structure and the gas duct wall 23. A transition from the downstream wall portion 19 to the adjacent gas duct wall 23 is even so that any disturbance caused by bleed on the passing gas flow is minimized. Further, an end 20 of the downstream wall portion 19 facing the outlet 17 is chamfered defining a flow path for the bleed gas 116 from the bleed passage 16 to the gas duct 7.

Four airfoils 21 (or stator vanes) are arranged substantially in parallel to each other in the outlet, see also FIG. 5, for guiding the bleed gas flow 116 to the secondary gas duct 7. The airfoils 21 are arranged at a distance from each other in the axial direction 2 of the engine 1.

The bleed passage 16 defines a flow path for deflecting the gas with a substantial inclination in relation to the passing gas flow 107 in the secondary gas duct 7. Preferably, the gas is deflected at an angle of at least 45 degrees and especially at an angle of at least 60 degrees in relation to the passing gas flow. More specifically, in the shown embodiment, the gas is deflected at substantially right angles with the passing gas flow.

Figure 3:
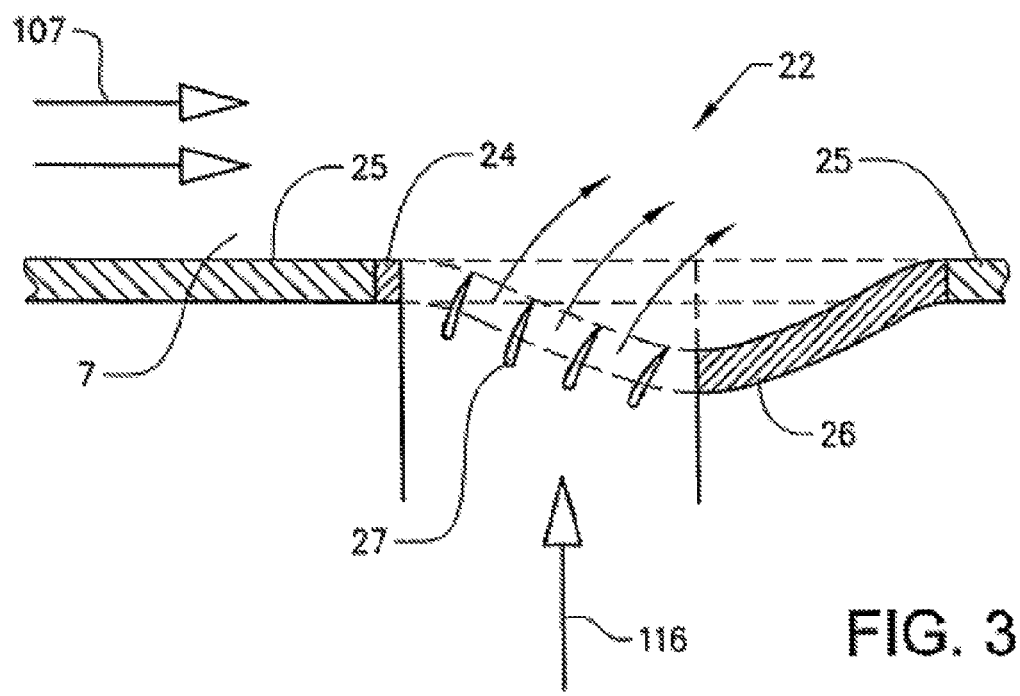
FIG. 3 shows a cut side view of a second embodiment of a bleed structure outlet configuration.

FIG. 3 shows an alternative embodiment of a structure 22 forming a bleed passage outlet to the secondary gas duct 7. An upstream wall portion 24 is substantially flush with the adjacent surfaces of the structure and the gas duct wall 25. Further, a transition from said upstream wall portion 24 to the adjacent gas duct wall 25 is even so that any disturbance caused by bleed on the passing gas flow 107 is minimized.

The downstream wall portion 26 is lowered relative to the adjacent surfaces of the structure and the gas duct wall 25. More specifically, the lowered wall portion 26 is elongated and extends along the downstream side of the outlet. Further, the lowered wall portion 26 has a contoured shape and shows a smooth, uninterrupted surface facing the gas flow. A transition from the downstream wall portion 26 to the adjacent gas duct wall 25 is even so that any disturbance caused by bleed on the passing gas flow is minimized. The downstream wall portion 26 is aerodynamically rounded for reducing discontinuities in the fan gas duct flow 107. Four airfoils 27 are arranged substantially in parallel to each other in the outlet for guiding a bleed gas flow 116 to the secondary gas duct 7.

Figure 4:
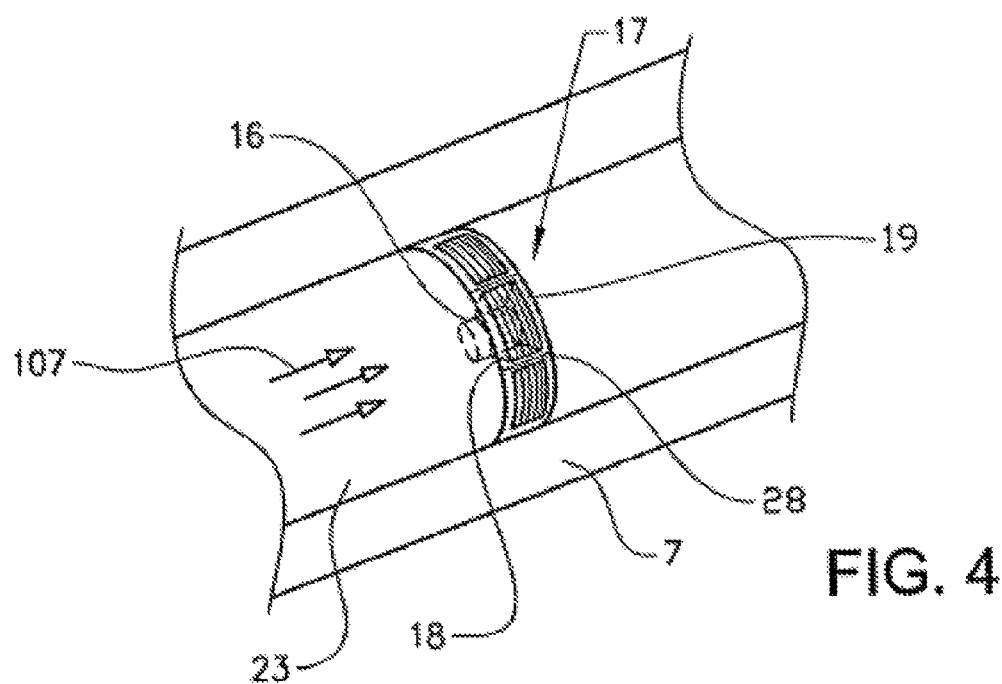
FIG. 4 shows a schematic perspective view of a gas turbine engine component comprising the bleed structure of FIG. 2.

FIG. 4 shows a perspective view of the outlet bleed structure 17 in FIGS. 1 and 2. The bleed structure 17 forms an annular component comprising a plurality of circumferentially spaced bleed passage outlets through the inner wall 23 of the secondary gas duct 7. A rectangular frame 28 surrounds each outlet, see also FIG. 5. The frames are joined to each other via flanges 31,32, see FIG. 5, to form said annular component. The structure 17 comprises means 50,51 for connection to an adjacent frame. The connection means may for example comprise a bolt connection. Through-holes 50,51 extend through each flange 31,32 for said connection means.

The frame 28 comprises said upstream wall portion 18 and downstream wall portion 19. Thus, the frames 28 are separate pieces, which are positioned in a slot or aperture in the gas duct wall 23. The frames 28 are arranged relative to the edges of the gas duct wall defining the slot or aperture in such a manner that the frames are substantially flush with the gas duct wall so that a passing gas flow is not disturbed by the edges of the frames.

According to the embodiment shown in FIG. 4, the term "bleed structure" comprises the plurality of frames forming the annular component. According to an alternative, the bleed structure forms a unison ring.

According to a further alternative, the term "bleed structure" comprises a single frame surrounding one or a plurality of openings.

Figure 6:
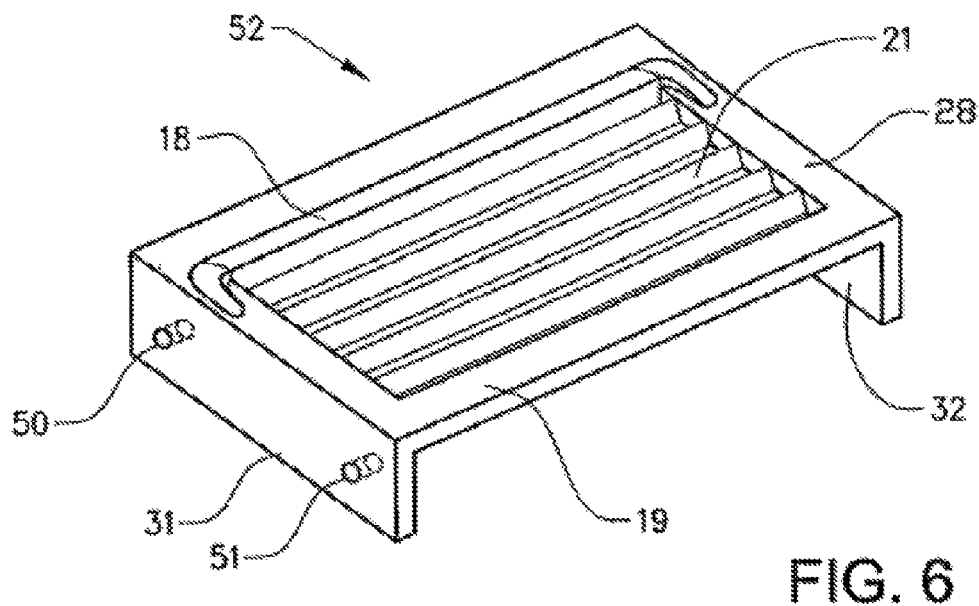
Figure 7:
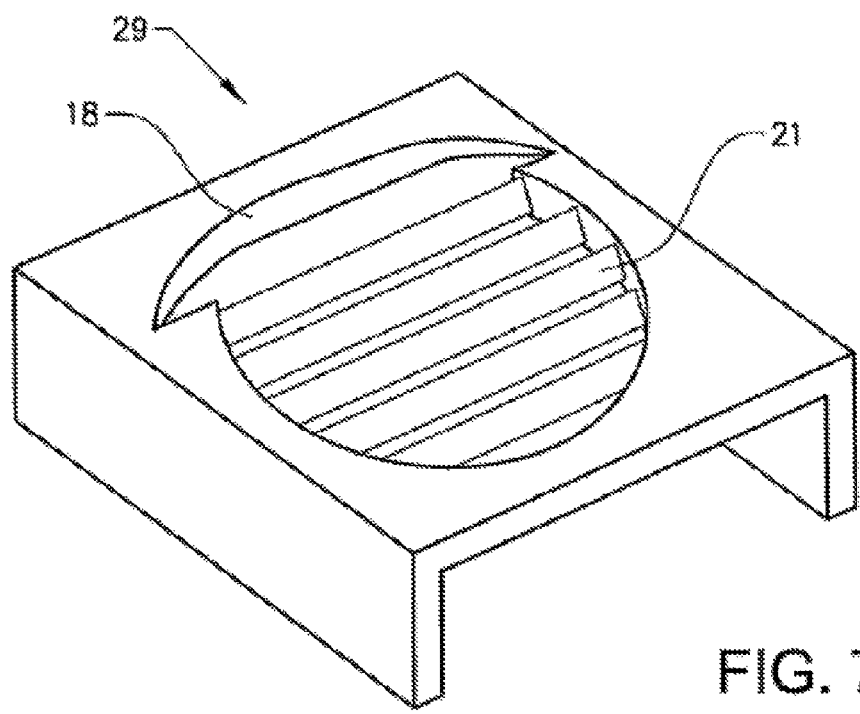
Figure 8:
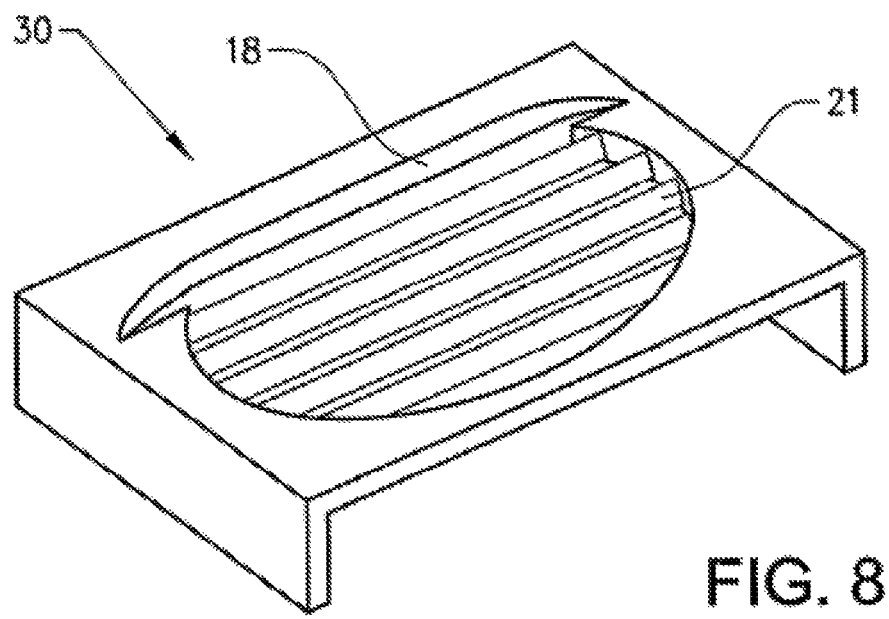
Figure 9:
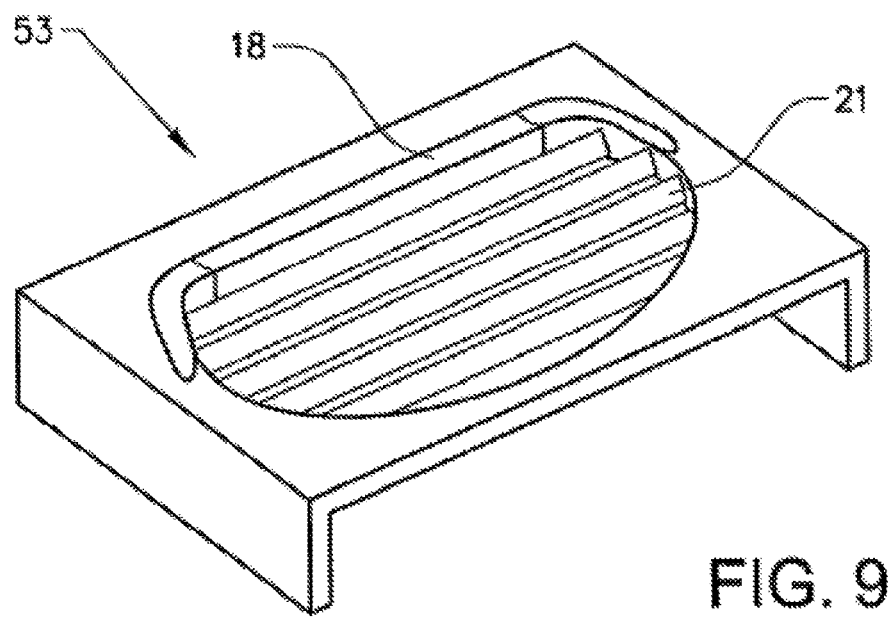

FIG. 5 illustrates the bleed structure 17 comprising a rectangular frame with a rectangular opening and a grid of airfoils 21. The airfoils 21 extend between two opposite sides of the rectangular frame and are fixedly attached to the frame. The airfoils 21 are arranged in parallel to the upstream and downstream wall portions 18,19. The elongated projection 18 has rounded edges in the circumferential direction of the gas turbine. FIG. 6 illustrates an alternative bleed structure 52. The elongated projection 18 extends at both ends a distance around the corner of the opening. FIG. 7 illustrates a further alternative bleed structure 29 comprising a rectangular frame with a substantially circular opening. FIG. 8 illustrates a further alternative bleed structure 30 comprising a rectangular frame with a substantially elliptical opening. FIG. 9 illustrates a still further alternative bleed structure 53. The elongated projection 18 extends at both ends a distance around the curved periphery of the opening. Each of the four alternative bleed structures 29,30,52,53 comprises a raised upstream wall portion 18 and a grid of airfoil 21.

Figure 10:
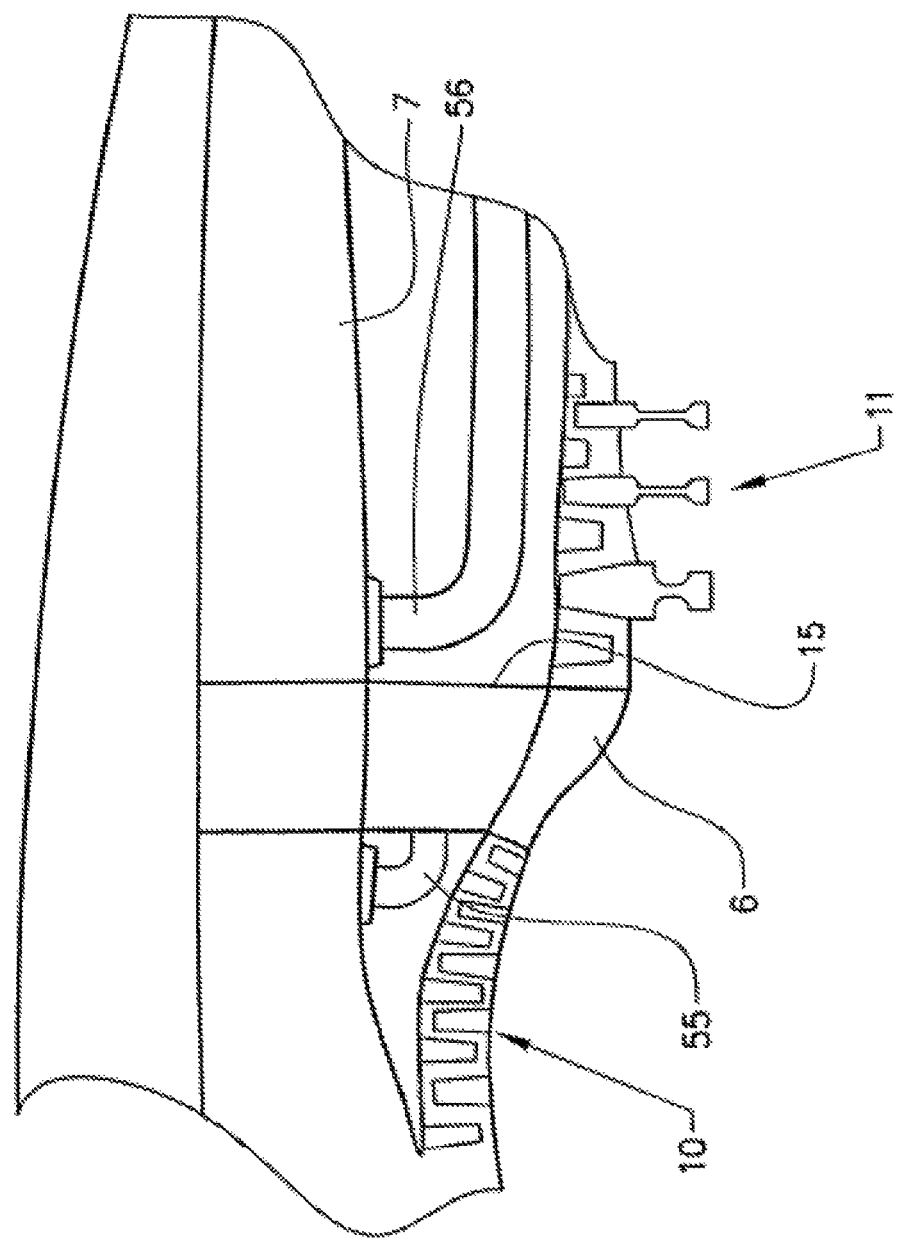
FIG. 10 shows a cut portion of an aircraft engine according to an alternative embodiment in a schematic side view.

FIG. 10 illustrates a compressor portion of an aircraft engine. More specifically, the region of the low pressure compressor 10 and the high pressure compressor 11 is shown. A bleed passage 55 is arranged to bleed air from the secondary gas duct 7 at a position upstream of the load carrying engine structure 15. The bled air may be introduced into the gas flow of the primary gas duct 6 or be used for cooling engine components or similar. An inlet of the bleed passage 55 is arranged in the inner wall defining the secondary gas duct 7.

A further bleed passage 56 is arranged to bleed air from the secondary gas duct 7 at a position downstream of the load carrying engine structure 15. The bled air is routed downstream for turbine cooling, but may as an alternative be introduced into the gas flow of the primary gas duct 6 or be used for cooling other engine components. An inlet of the bleed passage 56 is arranged in the inner wall defining the secondary gas duct 7.

Figure 11:
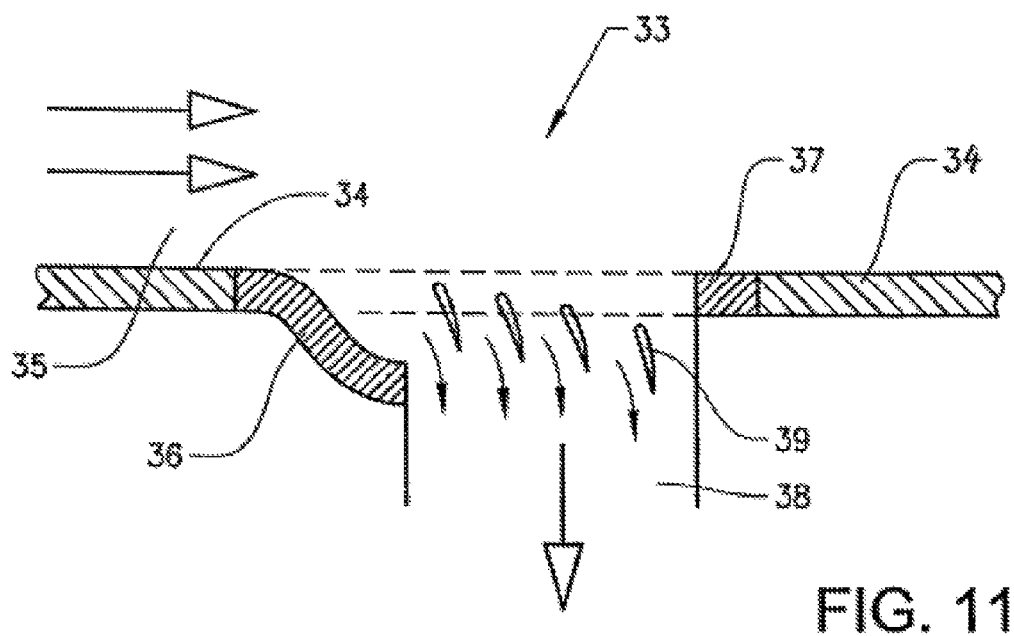
FIG. 11 shows a cut side view of a first embodiment of a bleed structure inlet configuration.

FIG. 11 illustrates a first embodiment of a bleed passage inlet structure 33. The inlet bleed structure 33 is arranged in a wall 34 defining a gas duct from which gas is extracted. The gas duct 35 may, according to one example, be formed by the secondary gas duct 7 in FIG. 1, see FIG. 10.

The wall 34 defining the gas duct 7 is substantially at the same level across the bleed opening (inlet). Thus, the wall 34 extends along a substantially straight line across the opening.

The bleed passage 55,56 defines a flow path for deflecting the gas with a substantial inclination in relation to the passing gas flow in the secondary gas duct 7. Preferably, the gas is deflected at an angle of at least 45 degrees and especially at an angle of at least 60 degrees in relation to the passing gas flow. More specifically, in the shown embodiment, the gas is deflected at substantially right angles with the passing gas flow.

An upstream wall portion 36 is lowered relative to the adjacent surfaces of the structure and the gas duct wall 34. Further, a transition from said upstream wall portion 36 to the adjacent gas duct wall 34 is even so that any disturbance caused by bleed on the passing gas flow is minimized. The downstream wall portion 37 is substantially flush with the adjacent surfaces of the structure and the gas duct wall 34. A transition from the downstream wall portion 37 to the adjacent gas duct wall 34 is even so that any disturbance caused by bleed on the passing gas flow is minimized. More specifically, the lowered wall portion 36 is elongated and extends along the upstream side of the inlet. The lowered wall portion 36 extends away from the gas duct wall 34 defining a flow path for the bleed gas from the gas duct 35 to a bleed passage 38. Further, the lowered wall portion 36 has a contoured shape and shows a smooth, uninterrupted surface facing the gas flow. The upstream wall portion 36 is aerodynamically rounded for reducing discontinuities in the gas duct flow.

A plurality of airfoils 39 are arranged substantially in parallel to each other in the inlet for guiding a bleed gas flow from the gas duct 35.

Figure 12:
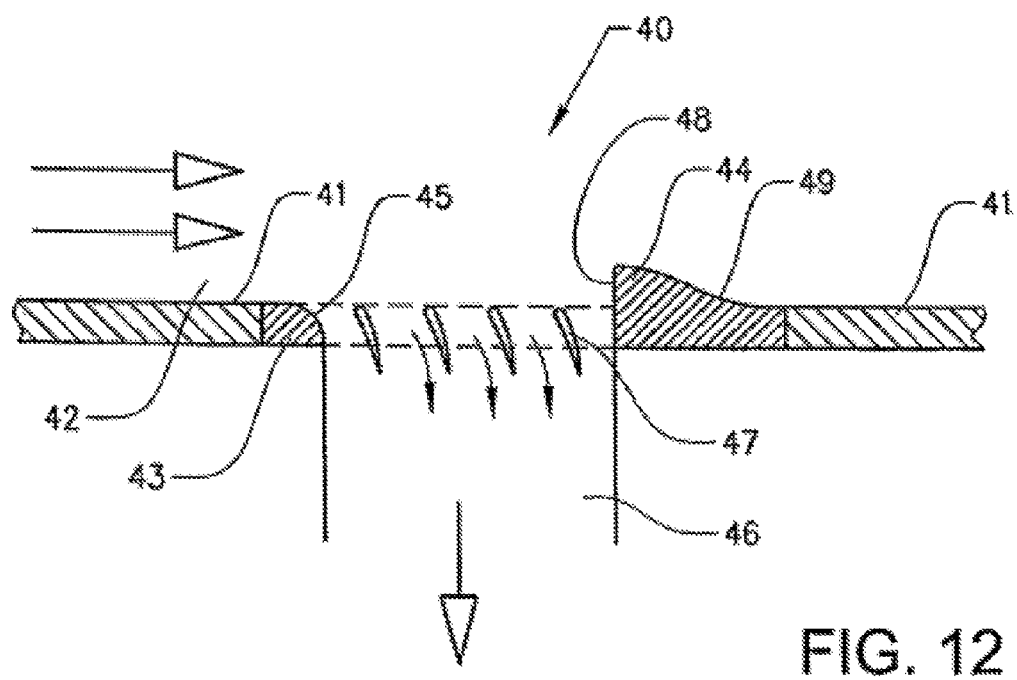
FIG. 12 shows a cut side view of a second embodiment of a bleed structure inlet configuration.

FIG. 12 illustrates a second embodiment of a bleed passage inlet structure 40. The inlet bleed structure 40 is arranged in a wall 41 defining a gas duct 42 from which gas is extracted. The structure 40 comprises a first, upstream wall portion 43 and a second, downstream wall portion 44. The upstream wall portion 43 is substantially flush with the adjacent surfaces of the structure and the gas duct wall 34. Further, an end 45 of the upstream wall portion 43 facing the inlet is chamfered defining a flow path for the bleed gas from the gas duct 42 to a bleed passage 46. The upstream wall portion 43 is smoothed and aerodynamically rounded for reducing discontinuities in the gas duct flow. A plurality of airfoils 47 are arranged in parallel to each other in the inlet for guiding a bleed gas flow from the gas duct 42.

The downstream wall portion 44 is raised relative to the adjacent surfaces of the structure and the gas duct wall 41. Further, the downstream wall portion 44 is raised relative to the upstream wall portion 43. The raised downstream wall portion 44 forms an elongated projection extending in the circumferential direction of the structure along a downstream side of the inlet. The downstream wall portion 44 has a substantially flat surface 48 facing the inlet and the surface 49 facing the gas duct 7 is smoothed and aerodynamically rounded for reducing discontinuities in the gas duct flow.

The bleed passage inlet structures of FIGS. 11 and 12 may further have a similar frame configuration as shown in any of FIGS. 5-9.

The wall portions defining the bleed passage opening are preferably stationary, i.e. non-variable with regard to each other.

The invention is also related to an arrangement for a gas turbine engine comprising the bleed structure described above. The arrangement comprises a section of a primary gas duct 6 for the engine, a section of a secondary gas duct 7 for the engine and said at least one bleed passage 16 connected to at least one of the primary gas duct section and the secondary gas duct section. Such an arrangement may be fabricated to form a separate unit, which in turn may be assembled to other units in order to build up an engine.

The invention is not in any way limited to the above described embodiments, instead a number of alternatives and modifications are possible without departing from the scope of the following claims.

According to an alternative to the embodiment where the bleed structure forms an annular component comprising a plurality of circumferentially spaced bleed passage openings, it may form an annular component comprising a continuous slot in a circumferential direction of the structure.

According to a further alternative, the bleed passage is arranged downstream of the combustor 12 for routing air from the primary gas duct 6 to the secondary gas duct 7. More specifically, it may be arranged between high pressure turbine 13 and the low pressure turbine 14.

According to a further alternative, the outlet configuration is not limited to be arranged through a radially inner wall of an outer gas duct, but may also be arranged in a radially outer wall of an inner gas duct, like the primary gas duct 6.

According to a further alternative, the inlet configuration is not limited to be arranged through a radially inner wall of an outer gas duct for extracting gas radially inwards, but may also be arranged in a radially outer wall of an inner gas duct, like the primary gas duct 6, for extracting gas radially outwards.

Further the inlet configuration is not limited to form an inlet to a bleed passage between a primary and a secondary gas duct. The inlet configuration may be used for a bleed passage from a gas duct for routing air to secondary systems like turbine cooling systems, aircraft systems etc.

Further, the number of airfoils in each bleed passage opening may of course differ from the four airfoils shown in the drawings.

Further, as an alternative to the embodiment where the bleed structure forms an annular component comprising a plurality of circumferentially spaced bleed passage openings, some of the openings, for example every second opening in the circumferential direction, is free from airfoils. According to a further alternative embodiment, the bleed structure is free from any airfoils.

The frames are preferably rounded in the circumferential direction of the gas duct in order to form a circular, continuous, uninterrupted ring, i.e. a ring free of any abrupt transitions between adjacent frames.

The invention has been described above for a two shaft engine, however, the invention may of course also be applied in a one shaft engine or in a three shaft engine.

According to an alternative embodiment of the bleed structure shown in FIGS. 4 and 5, the frames are fastened to an annular support member. Thus, in such a configuration, the frames are not connected directly to each other, but instead to the annular support member. Consequently, the flanges with holes for connection means do not extend perpendicular to an opening plane of the frame, but are instead arranged in line with the frame.

According to an alternative embodiment of the bleed structure, there is no frame around the respective opening. Thus, the opening ends directly in the gas duct wall.

The invention claimed is:

1. A turbofan gas turbine engine comprising an inner primary gas duct and a secondary gas duct and a bleed structure for at least one bleed passage between the inner primary gas duct and the secondary gas duct, the bleed structure comprising a first wall portion defining a first side of an opening for the at least one bleed passage, and a second wall portion defining a second side, opposite the first side of the opening, wherein a gas duct wall is substantially at a same level across the bleed passage opening, wherein the first and second wall portions end at different radial positions relative to a centerline axis of either the primary gas duct or the secondary gas duct in an extension direction of the bleed passage opening, one of the first and second wall portions is raised relative to immediately adjacent surfaces of the bleed structure, and the raised wall portion forms an elongated projection along a side of the opening so that the elongated projection is disposed at least one of downstream, in a gas flow intended direction in the gas ducts, of an inlet opening of the at least one bleed passage and upstream, in the gas flow intended direction in the gas ducts, of an outlet opening of the at least one bleed passage.

2. A turbofan gas turbine engine according to claim 1, wherein the other of the first and second wall portions is flush with the adjacent surfaces of the bleed structure.

3. A turbofan gas turbine engine according to claim 1, comprising at least one airfoil in the bleed passage opening for guiding the gas flow in the at least one bleed passage.

4. A turbofan gas turbine engine according to claim 3, wherein the at least one airfoil comprises a plurality of airfoils arranged substantially in parallel to each other in the bleed passage opening.

5. A turbofan gas turbine engine according to claim 1, comprising at least one frame surrounding the opening, and that the frame comprises the first and second wall portions.

6. A turbofan gas turbine engine according to claim 1, wherein the bleed structure forms an annular component comprising a plurality of circumferentially spaced bleed passage openings.

7. A turbofan gas turbine engine according to claim 1, wherein the bleed passage opening forms a continuous slot in a circumferential direction of the bleed structure.

8. A turbofan gas turbine engine according to claim 1, wherein the bleed passage opening is an outlet opening.

9. A turbofan gas turbine engine according to claim 1, wherein the bleed passage opening is an inlet opening.

10. A turbofan gas turbine engine according to claim 1, wherein a transition from the first wall portion to an adjacent gas duct wall is even.

11. A turbofan gas turbine engine according to claim 1, wherein a transition from the second wall portion to an adjacent gas duct wall is even.

12. A turbofan gas turbine engine according to claim 1, wherein the at least one bleed passage defines a flow path for deflecting the gas with a substantial inclination in relation to the passing gas flow.

13. A turbofan gas turbine engine according to claim 1, comprising the section of a primary gas duct for the engine, the section of a secondary gas duct for the engine and the at least one bleed passage connected to at least one of the primary gas duct section and the secondary gas duct section, wherein the bleed structure is arranged so that the first wall portion is located upstream of the opening and the second wall portion is located downstream of the opening.

14. A turbofan gas turbine engine according to claim 13, wherein the at least one bleed passage extends between the primary gas duct section and the secondary gas duct section.

15. An aircraft engine according to claim 1, comprising the at least one bleed passage that extends between the primary gas duct and the secondary gas duct.

* * * * *